United States Patent

Morano et al.

[11] Patent Number: 5,964,911
[45] Date of Patent: Oct. 12, 1999

[54] PROCESS FOR MAKING AN ABRASIVE COMPOSITION

[75] Inventors: James Morano, Miami, Fla.; Gerald P. Balcar, Dunkirk, N.Y.

[73] Assignee: Howard J. Greenwald, Penfield, N.Y.

[21] Appl. No.: 09/139,475

[22] Filed: Aug. 25, 1998

Related U.S. Application Data

[63] Continuation-in-part of application No. 09/123,741, Jul. 28, 1998.

[51] Int. Cl.⁶ ............................. C03B 5/18; C03B 19/08; C03B 5/16
[52] U.S. Cl. ............................. 65/19; 65/134.8; 501/155
[58] Field of Search ............................. 65/19, 21.1, 21.2, 65/21.5, 33.1, 66, 134.8; 501/28, 32, 155

[56] References Cited

U.S. PATENT DOCUMENTS

| | | | |
|---|---|---|---|
| 4,840,671 | 6/1989 | Lynn et al. | 106/85 |
| 5,273,566 | 12/1993 | Balcar et al. | 65/17 |
| 5,589,118 | 12/1996 | Ford, Jr. et al. | 264/122 |
| 5,830,251 | 11/1998 | Simpson et al. | 65/17.3 |

*Primary Examiner*—Stanley S. Silverman
*Assistant Examiner*—Jacqueline A. Ruller
*Attorney, Agent, or Firm*—Howard J. Greenwald

[57] ABSTRACT

A process for making an abrasive composition. In the first step of this process, from about 50 to about 85 weight percent electric arc furnace dust is mixed with at least about 10 weight percent of silica to prepare a thermally crystallizable mixture; the electric arc furnace dust has a particle size distribution such that at least about 70 weight percent of its particles are smaller than about 20 microns, and it contains from about 35 to about 65 weight percent of at least an iron material selected from iron, iron oxide, and mixtures thereof. Thereafter the mixture is melted by subjecting it to a temperature of from about 2,300 to about 2,900 degrees Fahrenheit to form a glass melt, the glass melt is quenched by reducing its temperature at least 1,000 degrees Fahrenheit in less than about 5 seconds to form a quenched glass, and the quenched glass is crushed by subjecting it to a pressure of at least 1.0 MegaPascal.

20 Claims, 1 Drawing Sheet

PROCESS FOR MAKING AN ABRASIVE COMPOSITION

CROSS-REFERENCE TO RELATED APPLICATION

This application is a continuation-in-part of applicants' copending patent application U.S. Ser. No. 09/123,741, filed on Jul. 28, 1998.

FIELD OF THE INVENTION

A process for making an effective, durable, and environmentally safe abrasive composition in which a mixture of electric arc furnace dust and silica is melted, quenched, and crushed.

BACKGROUND OF THE INVENTION

In the electric arc furnace (or "EAF") process used to make various grades of steel, a considerable amount of dust, known as "EAF dust," is generated. In addition to containing iron oxides derived from the steel making process, this dust also contains significant amounts of toxic substances, such as compounds of lead, cadmium, chromium, and other heavy metals. These toxic substances are contained in the dust in a potentially soluble condition, and the EAF dust thus has to be treated as a toxic material for waste disposal purposes. As is disclosed at lines 13–15 of column 1 of U.S. Pat. No. 5,278,111 of Scott W. Frame, "EAF dust is classified as a hazardous waste by the Environmental Protection Agency and is designated the identification K061."

U.S. Pat. No. 5,569,152 of Charles L. Smith, discloses that there " . . . are few effective, environmentally acceptable options for disposal of . . . hazardous waste compositions containing electric arc furnace dust . . . " (see lines 13–17 of column 1). This Smith patent teaches that the EAF dust may be fixated and/or stabilized in compositions containing lime, Portland cement, or class "C" fly ash, which are alkaline in nature but that, when such fixated and/or stabilized compositions are subjected to acid rain, the pH levels within the compositions will decrease, thereby allowing many of the heavy metals in the EAF dust (such as lead, nickel, and chromium, to be re-solubilized in water (see lines 15–25 of column 2).

The prior art also teaches that the danger from materials such as EAF dust can be substantially reduced by incorporating the materials into a vitreous composition. Thus, e.g., U.S. Pat. No. 5,273,566 of Gerald P. Balcar et al. discloses that (at lines 39–45 of column 2) "The principal danger from inorganic wastes is from heavy metal oxides and certain other oxides which may be considered 'hazardous.' Heavy metal oxides readily react when exposed to strong acids or alkalies to produce soluble compounds. Vitrifying the metal oxide in a glass substantially reduces the oxides' solubility in acid." The identical disclosure also appears in U.S. Pat. No. 5,462,570 of Gerald P. Balcar et al.

The vitrification process is energy intensive and relatively expensive, and it generally produces a product whose only commercial utility is for use in an landfill. It would be desirable to be able to make a useful, salable product from the vitrified EAF dust such as, e.g., a hard abrasive.

The prior art does teach that one can make an abrasive material of unspecified properties from vitrified electric arc furnace dust. Thus, for example, at lines 32–35 of column 2 of U.S. Pat. No. 5,738,694 of George W. Ford, Jr. et al., it is disclosed that "EAF dust has also been processed by blending with silicate materials, such as silica sand, clay, or cullet, and heated in a furnace to form a vitrified ceramic product. The ceramic is useful as an abrasive . . . "

Similarly, U.S. Pat. No. 5,009,511 of Leonard S. Sarko et al. discloses a process which, according to the patentees, produces a finished product which may be used " . . . to make grinding wheels, stones, sandpaper, shot blast material, and other abrasives . . . " (see column 17, lines 4–7). As was indicated by an amendment filed in the case (U.S. Ser. No. 07/471,042) on Aug. 21, 1990, the process of this patent " . . . comprises three key steps (1) oxidation-reduction reaction, (2) blending with silicate, and (3) vitrification. The oxidation-reduction reaction is necessary in order to place the inorganic hazardous waste components into a form for chemical reaction. The blending step is necessary to intimately mix the oxidation-reduction product with the silicates so as to ensure a complete reaction of the inorganic hazardous waste components with the silicates. The vitrification step is necessary in order to effect the chemical reaction which will chemically bind the inorganic hazardous waste components to the silicate matrix. These steps must be carried out in the aforementioned order . . . "

However, the aforementioned Balcar et al. patents teach that one cannot make a hard abrasive from vitrified oxide-containing material, such as vitrified EAF dust. Thus, e.g., in the section of Balcar et al.'s U.S. Pat. No. 5,273,566 starting at line 66 of column 2 (and extending to line 5 of column 3), Balcar et al. discuss U.S. Pat. No. 5,009,511 of Sarko et al. and state that "The Sarko et al. reference teaches a mobile system for fixing a hazardous waste in a silicate matrix . . . Although this reference teaches a vitrification process for disposal of hazardous wastes, it is directed to stabilizing those wastes in a silicate matrix. Further, while this type of material is acceptable for use in stabilizing wastes, it is inappropriate for fabrication of a high hardness, abrasive material."

The Balcar et al. U.S. Pat. No. 5,273,566 was issued in 1993. However, for many years prior to such issuance, it was widely known that vitreous materials were not suitable for making high hardness abrasive materials. Thus, for example, in 1964 U.S. Pat. No. 3,156,545 issued to Samuel S. Kistler et al. This patent disclosed (at lines 21–26 of column 2 ) that "It is well known that glassy materials are fragile and readily susceptible to fracture and disintegration and at least partially for this reason, the abrasive industry has intentionally avoided glassy compositions in abrasive grains up to the present time." Thus, by way of yet another example, in 1931 U.S. Pat. No. 1,830,757 issued and disclosed that glass is a "comparatively weak non-abrasive particle."

It thus is an object of this invention to provide a process for preparing an abrasive composition made from EAF dust which is environmentally safe and, additionally, does not exceed the United States Environmental Protection Agency's Leaching Procedure regulatory limits.

It is another object of this invention to provide a process for preparing an abrasive composition which is economical to produce.

It is another object of this invention to provide a process for preparing an abrasive composition with good hardness and fracture toughness properties.

It is yet another object of this invention to provide a process for preparing an abrasive composition which is effective. As is known to those skilled in the art, the mere fact that a material might have good hardness and fracture toughness properties does not necessarily mean that it will be a good abrasive. Thus, as is disclosed at page 5 of Richard L. McKee's "Machining With Abrasives (Van Nostrand Reinhold Company, New York, N.Y., 1982), "It has been observed that all abrasives are hard, but not all hard substances are abrasive. Indeed, there are several materials which are harder than either silicon carbide or aluminum oxide, but no so abrasive. Other factors than relative hardness enter into the picture in determining which abrasives to use on what materials. Diamond is harder than CBN, and more effective on carbides, but less effective on steels . . . Aluminum oxide is more effective on most steels and less so on nonferrous metals and nonmetallic substances than is silicon carbide. The best explanation of the problems of diamond an silicon carbide on steel is that there is a chemical reaction between the abrasive and the steels which in effect 'melts' the abrasive and causes excess wear."

SUMMARY OF THE INVENTION

In accordance with this invention, there is provided a process for making an abrasive composition in which electric arc furnace dust is mixed with silica to prepare a thermally crystallizable mixture. The thermally crystallizable mixture used in the process is melted by subjecting it to a temperature of from about 2,300 to about 2,900 degrees Fahrenheit. The glass melt is then quenched, and the quenched glass is then crushed.

BRIEF DESCRIPTION OF THE DRAWINGS

The invention will be described and illustrated by reference to this specification and the attached drawing, in which like reference numerals refer to like elements, wherein.

DESCRIPTION OF THE PREFERRED EMBODIMENTS

Figure 1:
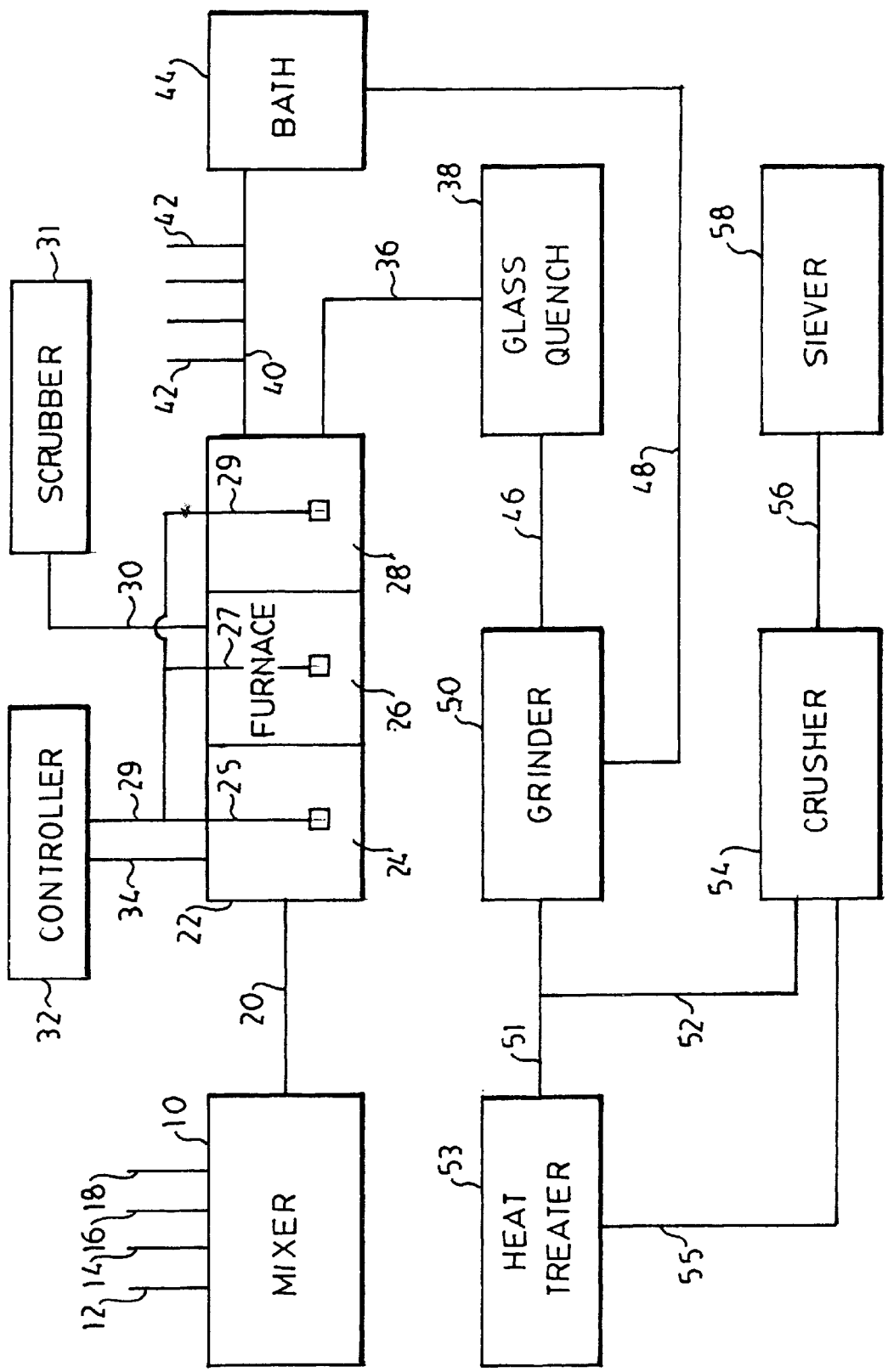
FIG. 1 is a flow diagram of a preferred process of the invention.

The first part of this specification will describe a preferred abrasive composition comprised of crystalline material. The second part of this specification will describe a preferred process for making such abrasive composition.

The composition of this invention preferably is comprised of both a glassy phase and crystalline phase. It generally contains from about 5 to about 80 percent of glass material, and from about 95 to about 20 percent of crystalline material.

The phases of the abrasive grains of the composition of this invention may be analyzed by X-ray diffraction analyses. In some of the analyses described hereinafter, a Siemens D-500 Diffractometer (model number C72298-A223-B-9-POZ-228), manufactured by the Siemens Company of Germany) was used with copper K-alpha radiation and a diffracted beam graphite monochrometer; see, e.g., U.S. Pat. No. 5,157,015, the entire disclosure of which is hereby incorporated by reference into this specification.

When a collection of abrasive grains occupying an area of about one square centimeter with a thickness about 50 microns (or thicker) is analyzed with the aforementioned X-ray diffraction technique, the majority phase present in the surfaces of such grains will be determined. When such analyses is conducted at a X-ray resolution of at least 5.0 percent, then it indicates that a crystalline phase is present in the surfaces of such grains as the majority phase. In one embodiment, the crystalline phase contains magnetite. Without wishing to be bound to any particular theory, applicants believe that the presence of the crystalline structure at the surfaces of their abrasive grains contributes to the excellent toughness and hardness properties such grains possess.

The abrasive grains of the composition of this invention are comprised of iron, silicon, calcium, and zinc, as identified by energy dispersive X-ray analysis (EDAX). As is known to those skilled in the art, such EDAX analysis indicates only the presence of the elements in the material, but does not, by itself, indicate whether the elements are uncombined or combined. In one embodiment, chromium is also detected by such EDAX analyses.

In one embodiment, the crystalline phase contains magnetite ($Fe_3O_4$), JCPDS 19-629. In another embodiment, the crystalline phase contained magnetite and elemental iron.

Without wishing to be bound to any particular theory, applicants believe that their novel abrasive grains are substantially inhomogeneous, i.e., the composition of the core of the grains differs from the composition of the surface of the grains. Furthermore, it is also believed that the surface of such grains is inhomogeneous, when measured by EDAX at a scale of 100 microns×100 microns (or smaller), varying from one surface site to another.

In one embodiment, it appears that the crystals present in the abrasive grains are embedded within a glass matrix.

In one embodiment, the abrasive composition of this invention is comprised of at least about 60 weight percent of ferrometasilicate, which has the formula $FeSiO_3$. As is indicated, e.g., in Robert C. Weast et al.'s "CRC Handbook of Chemistry and Physics," $63^{rd}$ Edition (CRC Press, Inc., Boca Raton, Fla., 1982–1983), iron(II) metasilicate has a molecular weight of 131.93, and a melting point of 1,146 degrees Centigrade. This iron compound is well known in the art and is described, e.g., in U.S. Pat. Nos. 5,326,526, 4,604,140, 4,519,811, 4,205,392, 3,650,802, 3,616,041, and the like. The disclosure of each of these United States patents is hereby incorporated by reference into this specification.

In this embodiment, the abrasive composition contains from about 60 to about 85 weight percent of such ferrometasilicate. In another embodiment, the abrasive composition contains from about 80 to about 85 weight percent of ferrometasilicate.

In one embodiment, the abrasive composition is also comprised of at least five weight percent of one or more spinels. As is known to those skilled in the art, a normal spinel is a material with the formula $AR_2O_4$, wherein A is a divalent metal ion and R is a trivalent metal ion. A is usually a divalent metal or mixture of divalent metals such as magnesium, ferrous ion, zinc, calcium, cadmium, cobalt, copper, nickel, strontium, barium, nickel, and manganese, and R is usually selected from the group consisting of ferric ion, aluminum, and chromium. Typical spinels exist when A is zinc and R is iron, when A is magnesium and R is aluminum, when A is iron and R is aluminum, when A is cobalt and R is aluminum, when A is nickel and R is aluminum, when A is manganese and R is aluminum, and when A is zinc and R is aluminum. See, e.g., pages 64–66 of W. D. Kingery et al.'s "Introduction to Ceramics," Second Edition (John Wiley & Sons, New York, 1976).

Alternatively, instead of the normal spinels described above, one may have one or more inverse spinels in which the divalent A ions and half of the trivalent R ions are on octahedral sites; and the other half of the R ions are on tetrahedral sites. The formula for these inverse spinels is $R(AR)O_4$. Some typical reverse spinels exist when R is iron and A is magnesium, when R is iron and A is Ti,Fe, when the spinel is ferric oxide, and the like. See, e.g., page 66 of the Kingery et al. reference.

Spinel structures are often found in abrasive compositions. See, e.g., U.S. Pat. Nos. 5,770,145, 5,690,707, 5,514, 631, 5,431,705, 5,431,704, 5,395,407, and the like. The disclosure of each of these United States patents is hereby incorporated by reference into this specification.

In one embodiment, the abrasive composition of this invention contains from about 7 to about 25 weight percent of one or more spinels.

In one embodiment, the abrasive composition of this invention contains at least 70 weight percent of its material in a crystalline structure, and at least 2 weight percent (and preferably at least five weight percent) of its material in an amorphous, vitreous structure. It s preferred that the abrasive composition contain at least about 80 percent of its material in a crystalline structure. In another embodiment, the abrasive composition contains at least 90 percent of its material in a crystalline structure.

The determination of the percent crystallinity in a material, and the percent glass, may be determined by the well-known X-ray diffraction technique. See, e.g., John P. Sibilia's "A Guide to Materials Characterization and Chemical Analysis," (VCH Publishers, Inc., New York, N.Y., 1988), at pages 115–133. Reference also may be had to an article by Ohlberg et al., "Determination of Percent Crystallinity by X-Ray Diffraction," American Ceramic Society, October, 1960, pages 170–171. One also may refer to U.S. Pat. Nos. 5,432,137, 5,358,631, 5,376,259, and the like, the entire disclosures of which are hereby incorporated by reference into this specification.

In this embodiment, it is preferred that the ratio of material in the composition which is crystalline to that material which is glass be from about 8/1 to about 50/1.

In one embodiment, the abrasive composition of this invention is preferably comprised of abrasive grains wherein at least about 60 weight percent of which have either the blocky and/or pyramidal (triangular) grain shape. In one preferred embodiment, at least about 70 weight percent of the abrasive particles are of the blocky and/or pyramidal shape. In one embodiment, an abrasive material which about 70 percent angular and 30 percent blocky became more angular in use.

These grain shapes are well known to those skilled in the art and are described, e.g., in U.S. Pat. Nos. 5,462,570, 5,372,620, 5,244,477, 5,185,012, 5,161,696, 5,129,919, 5,104,424, 5,103,598, 5,035,723, 5,009,676, 5,007,943, 4,848,041, and the like. The disclosure of each of these United States patents is hereby incorporated by reference into this specification.

The abrasive composition of this invention is substantially durable; it generates relatively little dust in use. In order to test the composition of this invention for durability, a test is conducted in which fifty pounds of abrasive are loaded into a 6.0 cubic foot Schmidt blasting pot (sold by the Schmidt Manufacturing Company of Houston, Texas) equipped with a feed valve and a number 6 nozzle. With this assembly, abrasive is blasted at 85 pounds per square inch onto four separate steel plates, each 6'×8', two of which are coated with scale, one of which is coated with ISO level sea rust, and one of which is coated with a synthetic coating; the plates are located 20 inches away from the nozzle. During the test, photographs are taken to determine the extent of dustiness. The abrasive composition of this invention produces relatively little dust.

Another indication of the substantial durability of the abrasive composition of this invention is its fracture toughness. The abrasive composition of this invention has a Vickers fracture toughness, as measured by the indentation technique, of from about 0.9 to about 1.3 (and, more preferably, from about 0.94 to about 1.2) megaPascals.meters$^{0.5}$. Means for determining Vickers fracture toughness are well known and are described, e.g., in U.S. Pat. Nos. 5,769,176, 5,759,933, 5,658,837, 5,655,956, and the like; the disclosure of each of these United States patents is hereby incorporated by reference into this specification.

The abrasive composition of this invention has a Vickers hardness, tested with a 200 gram load and a 10 to 15 second loading time, of at least about 550 and, more preferably, at least about 650. As is known to those skilled in the art, the Vickers hardness number is a number related to the applied load and the surface area of the permanent impression made by a square-based pyramidal diamond indentor having included face angles of 136 degrees. Means for determining Vickers hardness are well known to those skilled in the art and are described, e.g., in U.S. Pat. Nos. 5,066,619, 5,028, 567, 4,985,375, 4,861,657, 4,575,493, 3,657,780, and the like; the disclosure of each of these United States patents is hereby incorporated by reference into this specification. It is preferred to conduct hardness testing with a Vickers diamond indentor in open atmosphere conditions with a 200 gram load and 15 second dwell time.

The abrasive composition of this invention has a density of 2.8 to about 4.1 grams per cubic centimeter.

The abrasive composition of this invention is environmentally safe; it does not exceed the United States Environmental Protection Agency's Leaching Procedure regulatory limits. As is known to those skilled in the art, the Environmental Protection Agency has published a test (at 40 Code of Federal Regulations [C.F.R.] 268.7[a]) for determining the leachability of hazardous substances in a material. This test is well known and is described, e.g., in U.S. Pat. Nos. 5,769,961, 5,766,303, 5,762,891, 5,754,002, 5,744,239, and the like; the disclosure of each of these United States patents is hereby incorporated by reference into this specification.

When a 100-gram sample of the composition of this invention with a particle size not exceeding 70 microns is tested for leachability in accordance with the aforementioned test, no mercury is detected in the extractant fluid, less than about 0.2 parts per million of barium is detected in the fluid, no selenium is detected in the fluid, less than 0.2 parts per million of lead is detected in the fluid, less than 0.5 parts per million of chromium is detected in the fluid, less than 0.1 parts per million of cadmium is detected in the fluid, less than 0.005 parts per million of arsenic is detected in the fluid, and less than 0.04 parts per million of silver is detected in the fluid.

The abrasive composition of this invention exhibits superior speed of cleaning when used as a loose grain abrasive. In open blasting tests, samples of the abrasive were blasted at 85 pounds per square inch with a number 6 (⅜") nozzle at 14 to 20 inches.

A 20–50 abrasive composition was tested. This composition had a particle size distribution such that at least about 80 percent of its particles passed through a 20 mesh screen (841 microns) but were retained on a 50 mesh screen (297 microns). With heat treated SAE 2030 steel, the performance was 3.97 square feet per minute. With level A scale, the performance was 2.65 square feet per minute. with Level C Rust, the performance was 6.56 square feet per minute. With Coated Steel, the performance was 4.42 square feet per minute.

A 40–80 abrasive composition was tested. This composition had a particle size distribution such that at least about 80 percent of its particles passed through a 40 mesh screen (420 microns) but were retained on a 80 mesh screen (177 microns). With heat treated SAE 2030 steel, the performance was 5.1 square feet per minute. With level A scale, the performance was 2.88 square feet per minute. with Level C Rust, the performance was 4.88 square feet per minute. With Coated Steel, the performance was 1.93 square feet per minute.

A 50–120 abrasive composition was tested. This composition had a particle size distribution such that at least about 80 percent of its particles were passed through a 50 mesh screen (297 microns) but were retained on a 120 mesh screen (125 microns). With heat treated SAE 2030 steel, the performance was 5.9 square feet per minute. With level A scale, the performance was 3.83 square feet per minute. With Level C Rust, the performance was 3.98 square feet per minute. With Coated Steel, the performance was 3.8 square feet per minute.

A 80–200 abrasive composition was tested. This composition had a particle size distribution such that at least about 80 percent of its particles passed through a 80 mesh screen (177 microns) but were retained on a 200 mesh screen (74 microns). With heat treated SAE 2030 steel, the performance was 4.35 square feet per minute. With level A scale, the performance was 2.16 square feet per minute. with Level C Rust, the performance was 2.45 square feet per minute. With Coated Steel, the performance was 2.85 square feet per minute.

A preferred process for making the abrasive composition of this invention

The abrasive composition of this invention is preferably made from electric arc furnace dust. Electric arc furnace dust also is sometimes referred to as "EAF dust," "EAFD," or "baghouse dust."

Electric arc furnace dust is generally a mixture containing metal oxides that are collected by scrubbers, electrostatic precipitators, bag filters, or other known filtering systems in electric arc furnace (EAF) steel making facilities. It typically is composed mainly of oxides of iron, zinc, lead, tin, cadmium, chromium, manganese, nickel, copper, and molybdenum; but silica, lime, and alumina may also be present in the dust.

Electric arc furnace dust, and means for its use and/or disposal, are extensively described in the patent literature. See, e.g., U.S. Pat. Nos. 5,738,683 (formation of briquettes from EAFD), 5,698,759 (process for combining EAFD and polyvinylchloride), 5,672,146 (low temperature vitrification of a mixture of EAFD, silica, and alumina), 5,667,553 (process for recovering metals from EAFD), 5,589,118 (process for recovering iron from EAFD), 5,557,031 (use of electric arc furnace by-products in concrete), 5,368,627 (plasma treatment of oxide containing dusts), 5,338,336 (gasification of EAFD to produce reduction gas and molten iron), 5,278,111 (EAFD as a raw material for brick), 5,245,122 (stabilization of EAFD by entrapping it within a cementitiously hardened product), 5,188,658 (process for recovering zinc from zinc-containing waste materials), 5,186,742 (product made from EAFD, quicklime, calcium stearate, and waste paper), 5,013,532 (process for reducing and recovering zinc from EAFD), 4,911,757 (a calcium-alumino-silicate composition made from EAFD), 4,822,410 (reaction of a finely-divided volatile carbonaceous reductant with EAFD), 4,814,005 (formation of stable ceramic spinels from EAFD), 4,732,368 (pyrometallurgical treatment of EAFD), 4,673,431 (process for selectively vaporizing oxides from EAFD), and the like. The disclosure of each of these United States patents is hereby incorporated by reference into this specification.

It is preferred that the EAF dust used in the process of this invention have a particle size distribution such that at least about 70 weight percent of its particles are smaller than about 20 microns. In another embodiment, at least about 80 weight percent of the EAF dust particles are smaller than about 20 microns.

The EAF dust used in the process of this invention typically contains from about 35 to about 65 weight percent of at least one iron oxide compound and/or iron, and, more preferably, from about 45 to about 55 weight percent of iron oxide and/or iron. Thus, e.g., it may contain black iron oxide, such as, e.g., ferrosferric oxide, ferroferric oxide, iron oxide, magnetic, black rouge, and the like. Thus, e.g., it may contain hematite (also known as red iron ore, bloodstone, or iron oxide), which is a brilliant black to blackish red or red mineral with a density of from about 4.9 to about 5.3. Thus, e.g., it may contain the iron oxide identified as Chemical Abstracts number CAS 1309-37-1.

It is preferred that the EAF dust used in the process of this invention contain from about 0.1 to about 4.0 weight percent of one or more divalent metal oxides selected from the group consisting of cadmium oxide, lead oxide (such as, e.g., litharge), and mixtures thereof. In one embodiment, the EAF dust contains from about 0.5 to about 3.0 weight percent of lead oxide.

The EAF dust also preferably should contain from about 0.1 to about 3.0 weight percent of an oxide selected from the group consisting of aluminum oxide, chromium oxide, titanium oxide, and mixtures thereof.

In one embodiment, the EAF dust used in the process of this invention preferably contains from about 0.05 to about 5 weight percent of at least one oxide of chromium, also known as "chromic oxide" and, preferably, from about 0.05 to about 0.2 percent of at least one oxide of chromium. Thus, e.g., the chromic oxide may be chromium (III) oxide, chromia, chromium sesquioxide, green cinnabar, and the like. Without wishing to be bound to any particular theory, applicant believes that, during the process of this invention, the chromium molecules serve as crystallization sites for the spinels which form at the quench, thereby increasing the hardness of the abrasive formed.

The EAF dust used in the process of this invention can contain from about 10 to about 35 weight percent of zinc oxide, which is also known as "Chinese white" and "zinc white." In one embodiment, no zinc oxide is present in the EAF dust. Without wishing to be bound to any particular theory, it is believed that the zinc might facilitate the formation of spinel structures in the abrasive.

The EAF dust used in the process of the invention, in one embodiment, should preferably contain from about 0.1 to about 3.0 weight percent of one or more oxides of manganese, and/or from about 0.1 to about 3.0 weight percent of one or more oxides of magnesium. It is believed that these oxides also contribute to the formation of the desired spinel structure which, in turn, contributes to the desired hardness and fracture toughness properties of the abrasive.

In one embodiment, the EAF dust used in the process is obtained from Nucor Steel Company of Armorel, Arkansas as "Steel Mill Electric Arc Furnace Dust"

Referring to FIG. 1, and to the preferred embodiment depicted therein, it will be seen that EAF dust is charged via line 12 to mixer 10. In general, from about 50 to about 85 weight percent of EAF dust (by total weight of material in mixer 10) is charged to mixer 10. It is preferred to charge from about 50 to about 75 weight percent of the EAF dust to mixer 10. In one embodiment, from about 60 to about 70 weight percent of such EAF dust is charged to mixer 10.

Referring again to FIG. 1, in one preferred embodiment glass is charged via line 14 to mixer 10; in another embodiment, other sources of silica or silicates or charged via line 14. In this embodiment, it is preferred that the glass so charged be crushed to a particle size distribution such that at least about 70 percent of its particles have a maximum dimension smaller than about 1.0 centimeter. It is even more preferred that glass used be glass cullet.

As is known to those skilled in the art, cullet is broken or reclaimed glass; it often is fragments of scrap glass for production operations which are collected and recycled. Glass cullet is well known and is described, e.g., in U.S. Pat. Nos. 5,620,491, 5,588,978, 5,578,102, 5,558,691, 5,556,443, 5,529,594, 5,524,837, 5,498,285, 5,460,638, 5,399,181, 5,350,118, 5,342,427, 5,125,943, 4,875,919, 4,797,092, 4,793,845, 4,781,742, 4,723,979, 4,696,690, 4,549,893, and the like. The disclosure of each of these United States patents is hereby incorporated by reference into this specification.

One preferred glass cullet is soda lime glass cullet of mixed chips, which is preferably obtained from residential glass recycling plants; soda lime glasses contain silica, sodium oxide, and calcium oxide. Soda lime glass cullet material is well known and is commercially available; see, e.g., U.S. Pat. Nos. 5,731,367, 5,585,452, 5,563,232, 5,538,786, 5,468,432, 5,350,778, 5,028,569 (virgin soda lime glass cullet), 4,934,307, 4,541,842, and the like. The disclosure of each of these United States patents is hereby incorporated by reference into this specification.

Instead of using soda lime glass and/or soda lime glass cullet, one may additionally and/or alternatively use other glass compositions such as borosilicate glass, aluminosilicate glass, Vicor glass, fused silica glass, borax glass, transparent mirror glass, and the like. These and other glasses are descried on pages 376–382 of George S. Brady et al.'s "Materials Handbook," Thirteenth Edition (McGraw-Hill, Inc., New York 1991).

In one embodiment, the glass charged via line 14 contains from at least about 50 to about 75 weight percent of silica in the glass.

Regardless of which glass or glasses are used, it is preferred to charge from 5 to about 40 weight percent of glass, by weight of total material in mixer 10. In another embodiment, one charges from about 10 to about 30 weight percent of such glass is charged to the mixer 10. The EAF dust and the glass are charged so that their weight/weight ratio is preferably from about 2.0/1 to about 4.5/1.

Referring again to FIG. 1, and in the preferred embodiment depicted therein, at least about 5 weight percent of silica sand is charged to mixer 10 via line 16; in a more preferred embodiment, from about 10 to about 25 weight percent of silica sand is so charged. This silica sand preferably has a particle size distribution such that at least about 70 percent of its particles range in size from about 0.05 to about 2.0 millimeters.

One need not charge either glass cullet and/or silica sand to the mixer 10, as long as some silica-containing ($SiO_2$) material is charged to such mixture. In general, it is preferred to charge at least about 10 weight percent of silica (by total weight of silica and electric arc furnace dust) present in such mixture.

In one preferred embodiment, a sufficient amount of glass and/or silica sand and/or silica-containing material is added so that the final composition contains about 30 to 55 weight percent of silica.

Silica sand is well known to those skilled in the art and is described, e.g., in U.S. Pat. Nos. 5,613,453, 5,551,632, 5,492,548, 5,476,416, 5,472,500, 5,426,145, 5,411,352, 5,334,364, 4,401,638, 3,856,213, and the like. The disclosure of each of these United States patents is hereby incorporated by reference into this specification.

Referring again to FIG. 1, and in the preferred embodiment depicted therein, it will be seen that from about 0 to about 7 percent, and more preferably from 1 to about 5 weight percent, of glass flux material may be charged to mixer 10 via line 18. As is known to those skilled in the art, a flux is a substance added to a refractory material to aid in its melting. One may use any of the conventional glass fluxes commonly available such as, e.g., the glass fluxes disclosed in U.S. Pat. Nos. 5,613,453, 5,551,632, 5,492,548, 5,476,416, 5,472,500, 5,426,145, 5,411,352, 5,334,364, 4,401,638, 3,856,213, and the like. The entire disclosure of each of these United States patents is hereby incorporated by reference into this specification.

One preferred glass flux is sodium oxide, or a precursor material (such as sodium carbonate) which, upon heating, yields sodium oxide. It will be appreciate, when referring to any oxide materials herein, that one also may use precursor materials (such as, e.g., metal carbonates) which are transformed into the oxide by heating. Another preferred glass flux is calcium oxide, or its precursor. Yet another preferred glass flux is magnesium oxide, or its precursor. Barium oxide and/or strontium oxide, and/or their precursors, also may be used as a fluxing agent.

Other reagents also may be added to the glass batch in mixer 10. Thus, by way of illustration, one may charge from about 5 to about 15 weight percent of alumina, by total weight of material in the mixer and, more preferably, from about 5.5 to about 8.5 weight percent of alumina. In this embodiment, at least about 70 percent of the alumina particles charged are preferably smaller than 10 microns.

Referring again to FIG. 1, the glass batch from mixer 10 is conveyed via line 20 to furnace 22. Furnace 22 preferably has an elongated shape and is equipped with a multi-zone temperature control.

In one preferred embodiment, the furnace has a low velocity exhaust. Furnaces with low velocity exhaust are well known to those skilled in the art; see, e.g., U.S. Pat. No. 4,410,996, the entire disclosure of which is hereby incorporated by reference into this specification.

It is preferred, within furnace 22, to maintain the glass melt at a substantially constant shallow depth of from about 6 to about 12 inches; this is done to insure substantially that the same temperature will be found throughout the depth of the melt. Means for maintaining a melt at a shallow depth are well known to those skilled in the art and are described, e.g., in U.S. Pat. Nos. 4,289,571, 4,157,728, 4,002,468, 3,875,322, 3,801,309, and the like. The disclosure of each of these United States patents is hereby incorporated by reference into this specification.

In the preferred embodiment illustrated in FIG. 1, furnace 22 is preferably equipped with at least three heating zones, viz., heating zones 14, 26, and 28. In another embodiment, not shown, a furnace with only one melting zone is used.

In the preferred embodiment illustrated in FIG. 1, it is preferred to use heating zone 24 as a preheating zone. In this zone preheating zone 24, the furnace temperature is maintained at from about 1,500 to about 2,400 degrees Fahrenheit; a sensor, such as sensor 25, preferably monitors the temperature within the glass batch. The glass batch is maintained in this zone until substantially all of it is has reached the desired temperature of from about 1,500 to about 2,400 degrees Fahrenheit.

In this embodiment, the preheated glass batch is then subjected to a temperature of from about 2,300 to about 2,800 degrees Fahrenheit in melting zone 26; a sensor, such as sensor 27, monitors the temperature and the viscosity of the glass melt and determines when, in fact, it has been completely melted. The "soak time" during which the preheated glass batch is in the melting zone 26 preferably is from about 3 to about 5 hours, depending upon the size of the batch;, and, more preferably, it is from about 3.5 to about 4.5 hours.

During the melting process, in zone 26, gases form which may include hazardous substances incorporated therein in liquid, vapor, or particulate form. Thus, gases such as chlorine, fluorine, sulfur dioxide, mercury vapor, lead vapor, cadmium vapor, and the like, may be evolved.

The off gases produced during the melting process are preferably passed via line 30 to scrubber 31, which is adapted to remove hazardous particulate liquid and vapor byproducts from the gas entering the scrubber. Such exhaust gas scrubbers are well known and are described, e.g., in U.S. Pat. Nos. 5,627,682 (scrubber for waste gas), 5,593,469 (exhaust gas scrubber), 5,540,760, 5,512,097, 5,505,752, 5,415,684, 5,009,511, and the like. The disclosure of each of these United States patents is hereby incorporated by reference into this specification.

Referring again to FIG. 1, and in the preferred embodiment depicted therein, after the glass melt has been maintained in the melting zone 26 for the desired time, it is then preferably passed to refining zone 28. In this refining zone, the glass melt is preferably maintained in a substantially motionless state at a flow rate of less than about one inch per minute while being subjected to a temperature of from about 2,400 to about 2,900 degrees Fahrenheit. A sensor 29 is maintained in the glass melt to monitor the temperature and viscosity within the glass melt. Each of sensors 25, 27, and 29 is operatively connected to controller which, via feedback line 34, is adapted to maintain the desired temperatures in zones 24, 26, and 28.

In another embodiment, not shown, the refining zone 28 is omitted, and the molten glass from melting zone 26 is directly quenched.

The partially crystallized melt from refining zone 28 is withdrawn and quenched by preferably being contacted with water 42. It is preferred, when quenching the glass melt from furnace segment 28, that the temperature of the glass melt be reduced from its initial temperature (of from about 2,400 to about 2,900 degrees Fahrenheit) by at least about 1,000 degrees Fahrenheit in less than about 5 seconds. Thus, by way of illustration and not limitation, one may withdraw molten glass from furnace segment 28 into a molten glass stream 40 and blast one or more streams 42 of water against the molten flow 40 at a high pressure of from about 40 to about 60 pounds per square inch. In this embodiment, it is preferred to have the source of the water (not shown) be disposed at from about 10 to about 18 inches from the molten glass stream 40. In this process, following such high pressure quenching, the quenched material drops into a quenching bath of hot or boiling water 44.

Alternatively, or additionally, one may use other quenching methods. Thus, e.g., one may use the rapid cooling/quenching processes described in U.S. Pat. Nos. 5,779,743, 5,651,925 (process for quenching molten ceramic material), 5,645,619, 5,248,318 (rapid cooling of fused alumina-zirconia materials), 4,671,917, 4,126,429 (and the like. The disclosure of each of these United States patents is hereby incorporated by reference into this specification.

The quenched glass is then crushed or broken by suitable means, such as a hammer or ball mill, to form grits or particles. Any method for comminuting the solid can be used, and the term "crushing" is used to include all such methods. Thus, by way of illustration and not limitation, one may use one or more of the crushing methods described in U.S. Pat. Nos. 5,755,033 (crushing roll), 5,669,941, 5,259, 147 (wet grinding), 5,248,318, 5,203,513 ("product bed comminution" roller crushing), 5,102,429 (hammer mill, ball mill, or roll crusher), 5,083,714 (vertical shaft impact crusher), 4,881,951, 4,821,970 (impact crusher), 4,770,671, 4,591,364 4,240,586 (simultaneous crushing, grinding, and classifying), 4,126,429 (impact crushing), 4,086,067 (wet ball mill grinding), 3,151,816 (impact crusher), and like. The disclosure of each of these United States patents is hereby incorporated by reference into this specification.

Referring again to FIG. 1, and in the preferred embodiment depicted therein, the quenched glass is moved via an auger 46 in bath 44 and passed via lines 48 to grinder 50, in which the size of the quenched glass material is reduced so that substantially all of the glass particles have a largest dimension less than about 5 millimeters. It will be appreciated that the grinding can be conducted to produce other particle size distributions, both larger and smaller.

Other conventional grinding means may be used. Thus, by way of illustration and not limitation, one may use a size reduction auger to produce the frit which passes through a United States number 4 sieve, or through any other desired sieve. Reference may be had to U.S. Pat. Nos. 5,600,425, 5,505,388, and 5,419,102 for descriptions of size reduction augers; the disclosure of each of these United States patents is hereby incorporated by reference into this specification.

In one embodiment, the glass is comminuted so that the particles pass through a 20 mesh sieve (841 microns) but are retained on a 40 mesh sieve (420 microns); this is referred to as a 20/40 compact. In another embodiment, the glass is crushed so that the particles pass through an 80 mesh screen (177 microns) but are retained on a 120 mesh screen (125 microns); this is referred to as an 80/120 compact. In another embodiment, the glass is crushed so that the particles pass through a 20 mesh screen (841 microns) but are retained on a 30 mesh screen (595) microns; this is referred to as a 20/30 compact. In another embodiment, the glass is crushed so that the particles pass through a 40 mesh screen (420 microns) but are retained on a 60 mesh screen (250 microns); this is a 40/60 compact. In yet another embodiment, the glass is crushed so that the particles pass through a 120 mesh screen (125 microns) but are retained on a 200 mesh screen (74 microns); this is a 120/200 compact Referring again to FIG. 1, and in the preferred embodiment depicted therein, after the glass has been ground in grinder 50 to a size such that substantially all of its particles are smaller than about 5 millimeters, or to any other desired particle size distribution, the ground glass may then be passed via line 52 to siever 54, in which the desired particle sizes are produced for the final product.

It is preferred, when comminuting the quenched glass to form the abrasive material, to subject the quenched glass to a pressure of at least about 1.0 MegaPascal.

As will be appreciated by those skilled in the art, other classifying means besides sieving may be used to classify the crushed material. Thus, by way of illustration and not limitation, one may use one or more of the classification means disclosed in U.S. Pat. Nos. 2,912,918, 3,026,789, 4,132,533 (sieving machine), 4,142.871, 4,240,586 (simultaneous crushing, grinding, and classifying), 4,325, 292 (blast room collection and classification), 4,551,241 (particle classifier), 4,591,364 (screening), 5,014,468, 5,034, 360, 5,161,696 (electrical classification), 5,248,318, 5,353, 729, 5,531,799 (sieving and classification), 5,428,318, 5,468,174, 5,591,364, 5,695,385 (classification with an auger), and the like. The disclosure of each of these United States patents is hereby incorporated by reference into this specification.

In one alternative embodiment, illustrated in FIG. 1, prior to being fed to siever 54, the ground material from grinder 50 is first passed via line 51 to heat treater 53. Applicant has found, unexpectedly, that heat treatment at this stage of the process substantially improves the properties of the finished product.

In heat treater 53, it is preferred to subject the ground material to a temperature of from about 740 to about 760 degrees Centigrade for about 2.5 to about 3.5 hours. The material is first raised from ambient temperature to the soak temperature of 740–760 degrees Centigrade over a period of from about 3.5 to about 4.5 hours, held at the soak temperature for from about 2.5 to about 3.5 hours, and then cooled over a period of at least 7 hours.

In one embodiment, the furnace used for heat treater 53 is a 30 square foot shuttle furnace manufactured by the Frederick Kiln Company of Alfred Station, New York. This furnace contains an orifice metering system, a multiple burner flame supervisory system, valve actuators, gas regulators, and a turboblower, all of which are manufactured by the North American Inc. Manufacturing Company of 4455 East 71$^{st}$ Street, Cleveland, Ohio. The furnace is also equipped with a Yokogawa Electric Program Controller, Model UP25, and a primary control manufactured by the Honeywell Corporation. The furnace also contains an ultraviolet flame detector manufactured by Honeywell.

The heat treated material from heat treater 53 is preferably passed via line 55 to siever 54. The sieved material from siever 54, is passed via line 56 to bagger 58, wherein the sieved particles are bagged.

In one embodiment, the composition of this invention can be used as roofing granules. In this embodiment, it is preferred the particle sizes of the granules range from about 0.2 to about 2.0 millimeters. The roofing granules of this invention may replace prior roofing granules in such structures as those disclosed, e.g., in U.S. Pat. Nos. 5,516,573 (roofing granules embedded in asphalt), 5,382,449, 4,380,552, 5,206,068, and the like. The disclosure of each of these United States patents is hereby incorporated by reference into this specification.

In another embodiment, the composition of this invention can be used as a proppant; it can be suspended in drilling fluid during the fracturing portion of the drilling operation to keep the fracture open when fluid is withdrawn. Thus, e.g., such composition may be used as a proppant in one or more of the applications disclosed in U.S. Pat. Nos. 5,620,049, 5,604,194, 5,597,043, 5,595,245, 5,582,250, 5,575,335, 5,562,160, 5,558,161, 5,531,274, 5,515,920, and the like. The disclosure of each of these United States patents is hereby incorporated by reference into this specification. In one aspect of this embodiment, the particle size of the proppant particles used is from about 0.2 to about 3.0 millimeters.

In another embodiment, the composition of this invention can be used to manufacture foam glass. As is known to those skilled in the art, foam glass is a light, black, opaque cellular glass made by adding powdered carbon to crushed glass and firing the mixture. Thus, one may use the composition of this invention in one or more of the processes or structures described in U.S. Pat. Nos. 5,069,960 (foam glass tile), 4,990,398 (foam glass tile), 4,833,015 (multilayer foam glass structure), 4,798,758 (foam glass with crust layer), 4,703,019, 4,430,108, 4,430,107, 4,124,365, 4,038,063, 4,024,309 (foam glass structural element), 3,975,174, 3,951,632, 3,811,851, 3,767,377, and the like. The disclosure of each of these United States patents is hereby incorporated by reference into this specification.

In one preferred embodiment, the composition of this patent is used to make foam glass structural elements or foam glass panels, such as those described in U.S. Pat. Nos. 4,024,309, 5,464,114, 4,557,090, 4,463,043, 3,628,937, and the like. The disclosure of each of these United States patents is hereby incorporated by reference into this specification. It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A process for making an abrasive composition, comprising of the steps of sequentially:
   (a) mixing from about 50 to about 85 weight percent of electric arc furnace dust and at least about 10 weight percent of silica to prepare a thermally crystallizable mixture, wherein:
      said electric arc furnace dust has a particle size distribution such that at least about 70 weight percent of its particles are smaller than about 20 microns, and
      said electric arc furnace dust comprises from about 35 to about 65 weight percent of at least an iron material selected from iron, iron oxide, and mixtures thereof,
   (b) melting said thermally crystallizable mixture by subjecting it to a temperature of from about 2,300 to about 2,900 degrees Fahrenheit, thereby forming a glass melt,
   (c) quenching said glass melt by reducing its temperature at least 1,000 degrees Fahrenheit in less than about 5 seconds, thereby forming a quenched glass, and
   (d) crushing said quenched glass by subjecting it to a pressure of at least 1.0 MegaPascal.

2. The process as recited in claim 1, wherein said electric arc furnace dust is comprised of from about 45 to about 55 weight percent of an iron material selected from the group consisting of iron, iron oxide, and mixtures thereof.

3. The process as recited in claim 1, wherein said electric arc furnace dust is comprised of from about 0.1 to about 4.0 weight percent of a divalent metal oxide selected from the group consisting of cadmium oxide, lead oxide, and mixtures thereof.

4. The process as recited in claim 1, wherein said electric arc furnace dust is comprised of from about 0.1 to about 3.0 weight percent of an oxide selected from the group consisting of aluminum oxide, chromium oxide, titanium oxide, and mixtures thereof.

5. The process as recited in claim 1, wherein said electric arc furnace dust is comprised of from about 10 to about 35 weight percent of zinc oxide.

6. The process as recited in claim 1, wherein from about 50 to about 75 weight percent of said electric arc furnace dust is mixed with said silica.

7. The process as recited in claim 6, wherein said silica is in the form of a material selected from the group consisting of glass, sand, and mixtures thereof.

8. The process as recited in claim 7, wherein from about 5 to about 40 weight percent of glass is mixed with said electric arc furnace dust.

9. The process as recited in claim 8, wherein said glass is soda lime glass.

10. The process as recited in claim 8, wherein said glass is comprised of from about 50 to about 75 weight percent of said silica.

11. The process as recited in claim 7, wherein from about 5 to about 30 weight percent of glass is mixed with said electric arc furnace dust.

12. The process as recited in claim 11, wherein the ratio of said electric arc furnace dust to said glass is from about 2.0/1 to about 4.5/1.

13. The process as recited in claim 7, wherein at least about 5 weight percent of silica sand is mixed with said electric arc furnace dust.

14. The process as recited in claim 8, wherein at least about 5 weight percent of silica sand is mixed with said electric arc furnace dust.

15. The process as recited in claim 1, wherein from about 1 to about 5 weight percent of glass flux is mixed with said electric arc furnace dust.

16. The process as recited in claim 15, wherein said glass flux is selected from the group consisting of sodium oxide, calcium oxide, magnesium oxide, sodium carbonate, calcium carbonate, and magnesium carbonate.

17. The process as recited in claim 1, wherein from about 5 to about 15 weight percent of alumina is mixed with said electric arc furnace dust.

18. The process as recited in claim 1, wherein said thermally crystallizable mixture is melted by subjecting it to a temperature of from about 2,300 to about 2,900 degrees Fahrenheit for from about 3 to about 5 hours.

19. The process as recited in claim 1, wherein said glass melt is quenched by contacting it with water.

20. The process as recited in claim 1, wherein, prior to the time said quenched glass is crushed, it is subjected to a temperature of from about 740 to about 760 degrees Centigrade for from about 2.5 to about 3.5 hours.

* * * * *